Jan. 27, 1970   E. SAUER ET AL   3,491,666
PHOTOGRAPHIC CAMERA

Filed April 10, 1967   3 Sheets-Sheet 1

Jan. 27, 1970  E. SAUER ET AL  3,491,666
PHOTOGRAPHIC CAMERA
Filed April 10, 1967  3 Sheets-Sheet 3

United States Patent Office 3,491,666
Patented Jan. 27, 1970

3,491,666
PHOTOGRAPHIC CAMERA
Edgar Sauer, Stuttgart-Rohr, and Johann Hahn, Stuttgart, Germany, assignors to Zeiss Ikon Aktiengesellschaft, Stuttgart, Germany, a corporation of Germany
Filed Apr. 10, 1967, Ser. No. 629,771
Claims priority, application Germany, Apr. 21, 1966, Z 12,181
Int. Cl. G03b *19/00;* F21v *19/04*
U.S. Cl. 95—11
10 Claims

ABSTRACT OF THE DISCLOSURE

A photographic camera equipped with a flash exposure range and a daylight exposure range and a mount for inserting therein a flashcube. A manually operable handle for changing the exposure range from flash to daylight is operatively connected with the mount for the flashcube and automatically moves the next bulb into operative position when the handle is moved to its flash exposure position. The handle has a pawl member or resilient rod member attached thereto for engaging pins which extend from the mount to thereby rotate the mount in response to movement of the handle of the flash exposure position. The handle may be mounted coaxial with the flashcube mount or arranged at a different position on the camera casing from that of the mount.

---

The invention relates to a photographic camera provided with a mount for receiving a flash bulb carrier containing a plurality of flash bulbs, in particular a flashcube, or a separate flash unit for such a flash bulb carrier, said camera being further provided with operating ranges for daylight and flash exposures and with a handle for adjusting the camera to either one of these operating ranges, whereby this handle is movable from its initial position denoting the operating range for daylight exposures into the opposite position denoting the range for flash exposures from which upon release it returns automatically to its initial position.

Photographic cameras and separate flash units are known which are provided with mounts for receiving flash bulb carriers containing a plurality of flash bulbs, particularly so called flashcubes. It is also known to arrange these mounts rotatably and to couple the operation of advancing the flash unit from bulb to bulb with the lever for advancing the film and winding the shutter or with the release button.

These known devices have the disadvantage that in alternatingly taking daylight or flash pictures, the flash unit has to be constantly attached to or removed from the camera, respectively. If it would be kept on the camera, only flash pictures could be taken because simultaneously with advancing the film or releasing the shutter the flash unit would also be advanced from bulb to bulb.

According to the invention, this disadvantage is overcome in that cameras provided with operating ranges for daylight exposures and for flash exposures and a handle which for the purpose of changing these operating ranges is shifted from its initial position corresponding to the range for daylight exposures into the opposite position corresponding to the range for flash exposures, are provided with a device which synchronizes the motion of said handle for switching the operating ranges with a motion for advancing the flash unit from bulb to bulb.

This device may be a ratchet drive. According to the invention, the handle for changing the exposure ranges and a flash unit attached to the camera and having a number of rotation symmetric flash bulbs may be mounted in coaxial relationship.

Without changing the scope of the invention, it is also possible to arrange the handle for changing the exposure ranges and the mount for receiving the flash unit at different places of the camera casing and to bridge the distance between these two members by suitable drive means, such as a connecting rod or a tension rod, a cable, or the like. In accordance with the invention, a fixedly arranged mount may be so constructed that it engages the base of the flash unit in such a manner that the same is rotatable, leaving sections of the base or portions of the flash unit exposed to be engaged by a mounting disc.

The mount may also be rotatably arranged and in accordance with the invention the base of the flash unit, the mount itself or a part of the bearing connected with it may be provided with projections, recesses and the like, the number of which corresponding to the number of flash bulbs contained in the flash unit. These projections, recesses, etc. may be engaged by a member of the drive mechanism movable by way of the handle for switching the operating ranges of the camera.

Another feature of the invention is that the member of the drive mechanism which is movable by way of the handle for changing the exposure ranges engages the mount on a bearing portion connected therewith, respectively, by means of a resilient intermediary member. In that case, a locking member controlled by the camera release retains the mount against the action of said resilient intermediary member in the position it was in before the camera was changed from the daylight exposure range to the flash exposure range until the flash bulb is actually flashed. In other words, the mount synchronized with the handle for switching the exposure ranges of the camera is not rotatably advanced when that handle is moved to its flash exposure position, but the mount remains fixed in its given position. After the mount has been disengaged from the release controlled locking member upon release of the camera, it is advanced one step by the action of the aforesaid resilient intermediary member.

The inserted flash unit, then, remains unchanged in its position until a flash exposure is made, i.e. a flash bulb is used. In the event the photographer reverses his preparations for a flash exposure, the handle for setting the exposure ranges returns into its initial position "daylight exposure" without moving the flash unit. This will prove advantageous when flash exposures were made previously, using up bulbs and leaving only one flash bulb in the flash unit, because the manipulations connected with cancelling the preparations for a flash exposure will result in a faulty exposure when the handle for changing the exposure ranges again is moved into the flash exposure position. No flash could be fired because the last bulb that remained in the flash unit would have been moved on, i.e. out of its flash position, at the time the exposure range handle was moved back into the daylight position.

In a particularly simple embodiment of the invention the member of the drive mechanism which is movable by way of the handle for the exposure ranges and engages the aforementioned projections, recesses or the like, consists of a flexible tension rod which is linked to the handle or some member connected therewith and is supported by an area of the camera casing and which engages with its hooked end said projections or recesses, etc. In this manner it is possible to omit additional spring means for the turning aside of said tension rod transmitting the advancement motion.

The invention will be described in further detail with reference to the accompanying drawing. Details not essential to a proper understanding of the invention have been omitted for the sake of clarity.

In the drawings:
FIG. 1 is a simplified top plan view of a photographic camera in accordance with the invention;

Figure 1:
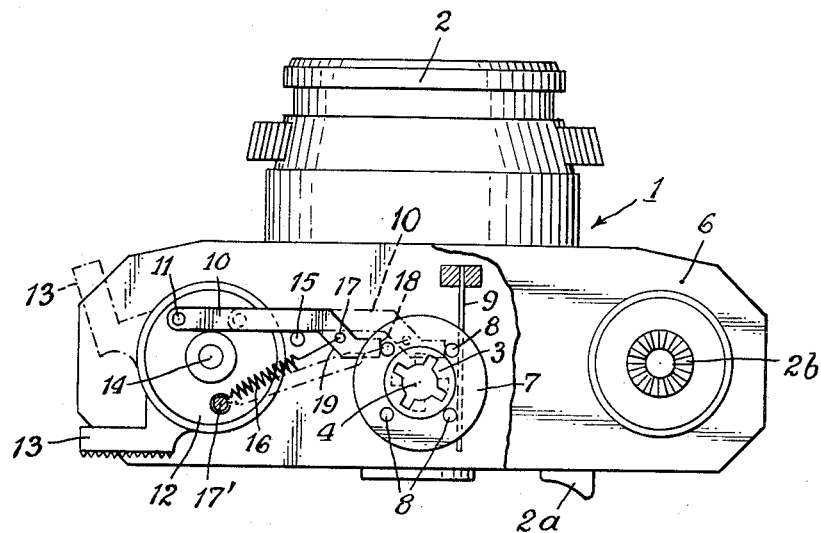
Figure 2:
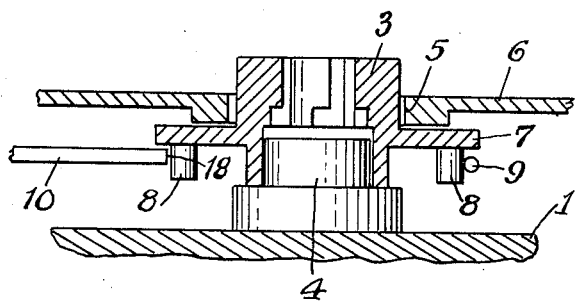
FIG. 2 is a vertical sectional view of a portion of the camera according to FIG. 1 in the area of the mount for a flashcube base.

Referring to the FIGS. 1 and 2, a camera 1 having a photographic objective 2, a film advance lever 2a and a release button 2b is provided in the central area of its top wall with a mount 3 for the base of a flash bulb carrier containing a plurality of flash bulbs, more particularly a flashcube. The mount 3 is rotatably supported by a stud 4 fixed in the camera casing and projects outwardly through an opening 5 in the top wall 6 of the camera 1. The top wall 6 secures the mount 3 against axial displacement. A flange 7 of the mount 3 is provided with four downwardly projecting pins 8 arranged symmetrically to the center axis of the mount 3. A spring 9 is attached with one of its ends to the camera casing and as a locking means is in cooperation with each two of the pins 8 at a time. A horizontal connecting rod 10 is pivotally mounted with one of its ends to an eccentric pin 11 on a disc 12 which in turn is connected to a pivotally mounted handle 13 for changing the exposure ranges. This disc 12 together with the handle 13 is mounted on a vertical shaft 14 in the casing of the camera 1. An abutment pin 15 in the camera casing 1 provides a unilateral guide for the connecting rod 10. For holding the connecting rod 10 in engagement with the pin 15, there is provided a helical spring 16 hooked with one of its ends into an opening 17 in the connecting rod 10 and with its other end to a pin 17' on the top wall 6. At the same time, the spring 16 by way of the connecting rod 10, the pin 11 and the disc 12 produces a torque which acts upon the handle 13 and keeps the same in the position corresponding to the operating range for daylight exposures. The connecting rod 10 is offset at one end. In the inoperative position, which corresponds to the daylight exposure range, the front end 18 of the connecting rod 10 is disposed in front of one of the pins 8. By offsetting the connecting rod 10 an inclined cam surface 19 is produced therein.

If a flash exposure is to be made, a flashcube is inserted with its base in the mount 3. Before making the exposure, the handle 13 is swung from its position "daylight exposures" indicated by solid lines into the position "flash exposures" indicated by dash-dotted lines (see FIG. 1). During this pivotal clockwise movement the front end 18 of the rod 10 engages the pin 8 in front of it and thereby rotates the mount 3 with the flashcube therein by an angle of 90° clockwise about the stud 4. During the initial part of the rotation up to 45° the force of the springs 9 and 16 has to be overcome. The rotation about the remaining angle of 45° is assisted, however, by the spring 9 which relaxes while the spring 16 is further tensioned. Upon completion of the 90° rotation the shutter and the diaphragm are adjusted to the flash exposure range and the flashcube or one of the flash bulbs in it, respectively, is connected to the automatic ignition device.

The next one of the pins 8 is now disposed behind the cam face 19. The spring 9 in cooperation with two adjacent pins 8 hold the mount in a position in which one of the flash bulbs together with its reflector is focused on the object.

After the flash exposure has been made, the handle 13 is released and it returns by the action of the spring 16 into its initial position (daylight exposures). Thereby the connecting rod 10 moves with its cam face 19 up to the pin 8 which is located behind the cam face 19. By the action of the spring 16 and the coaction of the cam face 19 and the pin 8 the connecting rod 10 moves upwardly above the pin 8 until it ultimately settles with its front face 18 in front of the pin 8.

The next exposure may now be a daylight exposure or again a flash exposure.

In a daylight exposure the handle 13 remains untouched. The handle 13 is again operated, however, when making another flash exposure. This may be repeated until all of the flash bulbs in the inserted flashcube are used up. Then the flashcube has to be replaced by a fresh one, and so forth.

Figure 3:
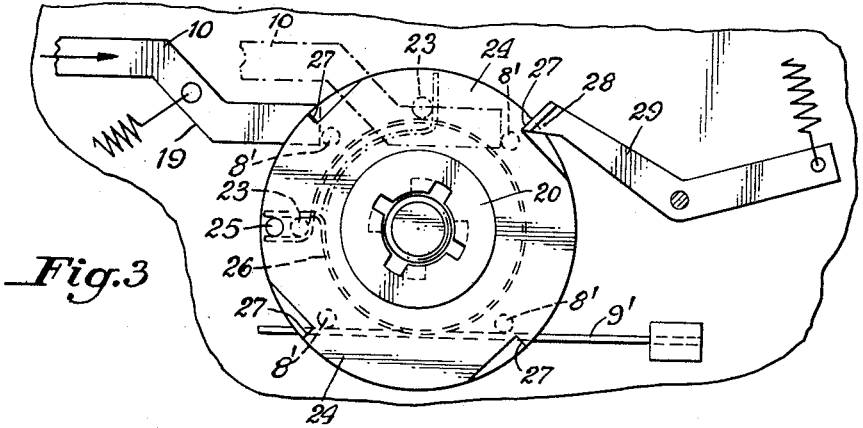
FIG. 3 is a top plan view of a portion of another embodiment of the invention.
Figure 4:
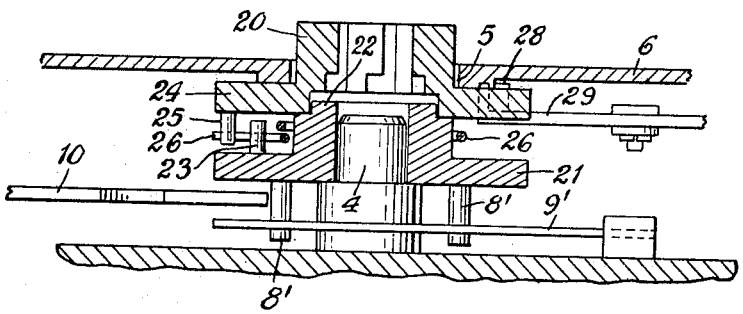
FIG. 4 is a vertical sectional view of the device according to FIG. 3 in the area of the mount for a flashcube base.

The embodiment illustrated in the FIGS. 3 and 4 discloses an improvement over that of FIGS. 1 and 2. In place of the mount 3 are employed a mount 20 and a cam disc 21 arranged in axial alignment with each other. The cam disc 21 is supported by the stud 4 and has a collar 22 for supporting the mount 20. The cam disc 21 in addition to the downwardly extending pins 8', which in the first described embodiment are disposed on the mount 3, carries also an upwardly extending pin 23 facing the mount 20. The mount 20 has a flange 24 the lower surface of which faces the cam disc 21 and carries a pin 25. An omega spring 26 is disposed between the lower face of the mount 20 and the upper face of the cam disc 21 and engages with its ends the two pins 23 and 25 which latter are arranged in radial alignment as shown in FIG. 3.

Notches 27 are provided in the circumference of the flange 24 of the mount 20 for interaction with a locking tooth 28 of a ratchet lever 29 controlled by the camera release mechanism. The spring 9' in cooperation with the pins 8' attached to the cam disc 21 again secures the mount 20 including the flashcube in its selected positions. The rest of the device including the connecting rod 10, the disc 12 and the handle 13 remain unchanged.

For making flash exposures, a flashcube is inserted with its base into the mount 20. When the handle 13 is moved into the position for flash exposures, the connecting rod 10 tensions the omega spring 26 by way of the pin 8' on the cam disc 21 previously engaged by it. One of the ends of the spring 26 is taken along by the pin 23, while the other end is detained by the pin 25.

If the photographer decides to make no more flash exposures, he simply lets go of the handle 13 which returns to its initial position and so does the cam disc 21.

When a flash exposure has been made, i.e. the flash bulb has been fired, the returning release means swings the ratchet lever 29 in known manner out of its latched position. Thereby the mount 20 is released and is now free to rotate by 90° under the action of the omega spring 26; this 90° rotation was previously accomplished by way of the connecting rod 10. Now the next flash bulb is ready to be flashed. When upon release the handle 13 is snapping back, the connecting rod 10 pulls out of the way of the pin 8 located in its range of movement, in the same manner as it has been described with reference to the embodiment illustrated in FIGS. 1 and 2.

The embodiment illustrated in the FIGS. 5 and 6 again employs the mount 3 of the embodiment shown in the FIGS. 1 and 2.

Figure 5:
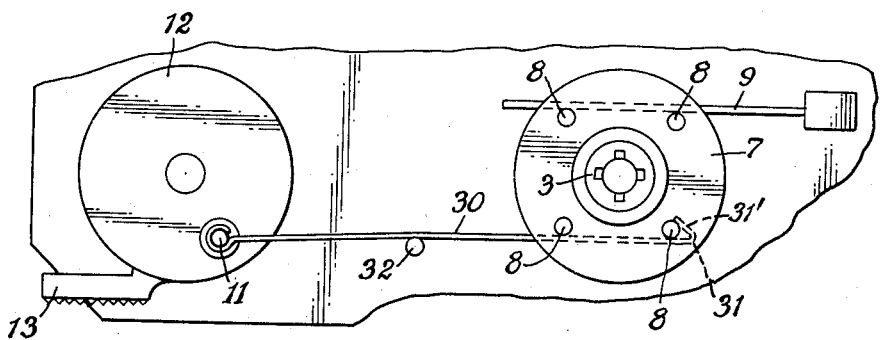
FIG. 5 is a top plan view of a third embodiment of the invention.
Figure 6:
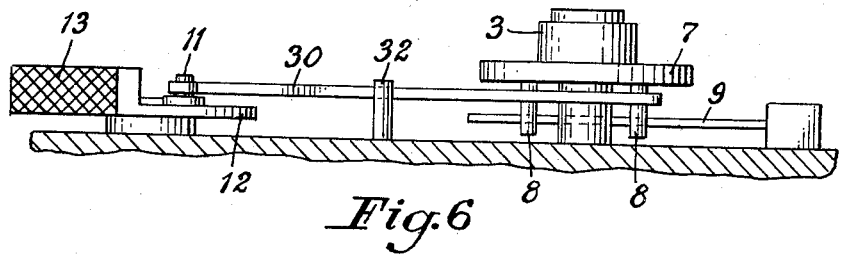
FIG. 6 is a supplementary sectional view of the device according to FIG. 5.

In place of the connecting rod 10 and the spring 16, however, is used a resilient tension rod 30 having a hooked end 31. A stationary abutment 32 engaging the center portion of the rod 30 imparts a slight pretensioning to the resilient tension rod 30 when the handle 13 and the disc 12 are in an inoperative position as shown in FIG. 5. The eccentric pin 11 on the disc 12 is arranged offset by 180° as compared with the embodiment of FIGS. 1 and 2, in order to be able to exert a pull to the tension rod 30 which is attached to the pin 11. In addition of being connected to the pin 11 and supported by the abutment 32 the resilient tension rod 30 in its starting position also engages two of the pins 8 on the flange 7 of the mount 3. When operating the handle 13, the hook 31 moves one of the pins 8 one step on. When the handle 13 returns to its starting position, the hook 31 with its inclined portion 31' engages the next one of the pins 8, resiliently bypasses it and settles in the rear of it.

This embodiment may also be used in connection with the other parts of the embodiments illustrated in FIGS. 1 and 2 and in FIGS. 3 and 4, respectively. Its function is then in accordance with the mode of operation of these embodiments.

Figure 7:
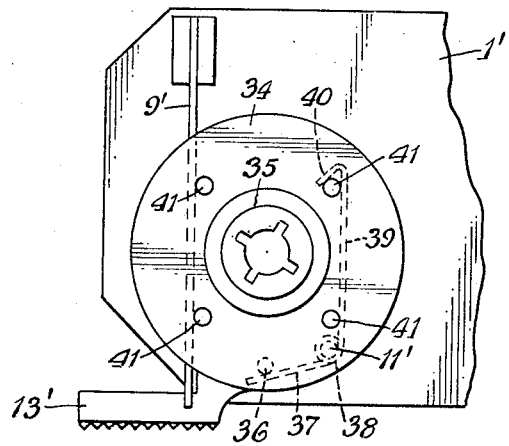
FIG. 7 is a partial top plan view of still another embodiment of the invention.
Figure 8:
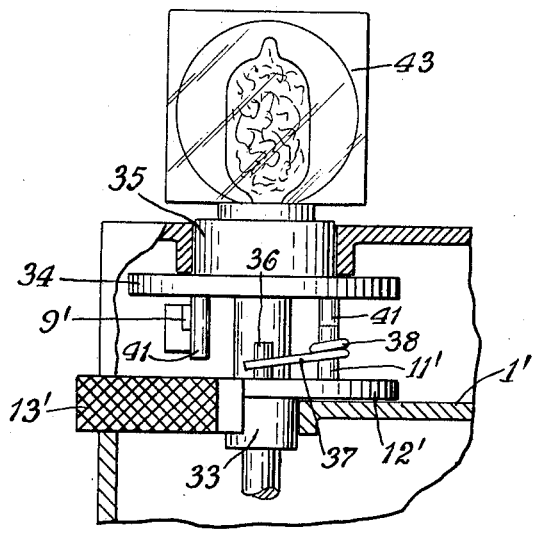
FIG. 8 is a vertical sectional view of the latter.

The FIGS. 7 and 8 illustrate an embodiment of the invention in which the pivot axis of the handle 13' is arranged in axial alignment with the center axis of the mount 35 for the flashcube. The camera casing 1' has mounted therein a vertical shaft 33 which serves as a pivot axis for the disc 12' carrying the pin 11' and the handle 13'. The shaft 33 also has mounted thereon the flashcube mount 35 having an outwardly extending flange 34 thereon. The disc 12' carries also an additional pin 36 which is engaged by one end 37 of a wire spring 38 having one winding placed around the pin 11' and a leg 39 with a hook-shaped end 40 engaging one of four pins 41 extending downwardly from the flange 34. A spring 9' is also used in this embodiment of the invention for securing the mount 35 in anyone of four selected positions in which a flashbulb in the flashcube 43 inserted in the mount faces the subject to be photographed. The spring 9' in similar manner as the spring 9 is fixed with one of its ends in the camera casing.

Upon moving the handle 13' in clockwise direction the hook-shaped end 40 of the spring 38 rotates the mount 35 into the next operative position by means of the pin 41, namely a distance of 90°. When the handle 13' returns to its starting position, the hook-shaped end 40 of the leg 39 of the spring 38 just prior to the end of the return movement of the handle 13' slides over the next following pin 41 and engages with its hook behind this pin 41.

What we claim is:

1. In a photographic camera having a first operating range for daylight exposures and a second operating range for flash exposures, a rotatable mount for a flash bulb carrier containing a plurality of flash bulbs, handle means for adjusting the camera from said first operating range to said second operating range, locking means for releasably holding said mount in flash bulb flashing position, means biasing said handle means toward said first operating range, and means operationally connecting said handle means with said mount for synchronizing the motion of said handle means in adjusting the camera to said second operating range with the indexing of said mount from one flash bulb flashing position to the next.

2. A photographic camera according to claim 1, in which said synchronizing means includes a ratchet mechanism.

3. A photographic camera according to claim 1, in which the pivot axis of said handle means and the center axis of said mount are identical.

4. A photographic camera according to claim 1, in which said handle means and said mount are arranged at different places of the camera casing interconnected and by an operative drive connection.

5. A photographic camera according to claim 1, including means for fixedly securing said mount and for rotatably receiving the base of said carrier, and means for operatively engaging said base for rotating the same with the flash bulbs thereon.

6. A photographic camera according to claim 1, including means for rotatably mounting said mount, a plurality of pins equal in number to the number of flash bulbs in said carrier projecting from said mount, said synchronizing means being provided for engaging said pins one at a time upon operating said handle means in a direction in which the exposure range is changed so as to rotate said mount.

7. A photographic camera according to claim 6, in which said synchronizing means includes a flexible tension rod one end of which is attached to said handle means, said tension rod being supported between its ends by an abutment in the camera casing and engaging with a hook at the other end one of said pins at a time, and at the same time in its initial position resiliently engaging the next adjacent pin on said mount.

8. A photographic camera according to claim 1 including a resilient intermediary member in said synchronizing means which is operated by said handle means, said resilient intermediary member being connected with said mount, a locking member controlled by a conventional camera release member engaging said mount and holding the latter against the action of said intermediary member in the position it was before changing said handle means from daylight exposure range to flash exposure range and also when changing to the flash exposure range until a flash bulb, which in this position is ready to be flashed, actually is flashed, said mount upon release of the camera being disengaged from said locking member and being advanced one step by the action of said resilient intermediary member.

9. A photographic camera according to claim 8, in which said resilient intermediary member comprises an omega spring.

10. A photographic camera according to claim 1, including locking means for securing any one of said flash bulbs in said carrier at a given time in its operative position.

References Cited
UNITED STATES PATENTS

| | | | |
|---|---|---|---|
| 3,087,318 | 4/1963 | Oswold | 95—11.5 XR |
| 3,353,467 | 11/1967 | Ernisse et al. | 95—11.5 |
| 3,354,300 | 11/1967 | Parsons et al. | 240—1.3 |
| 3,374,720 | 3/1968 | Harvey | 95—11.5 |

NORTON ANSHER, Primary Examiner

FRED L. BRAUN, Assistant Examiner

U.S. Cl. X.R.

240—37.1